United States Patent Office 3,109,231
Patented Nov. 5, 1963

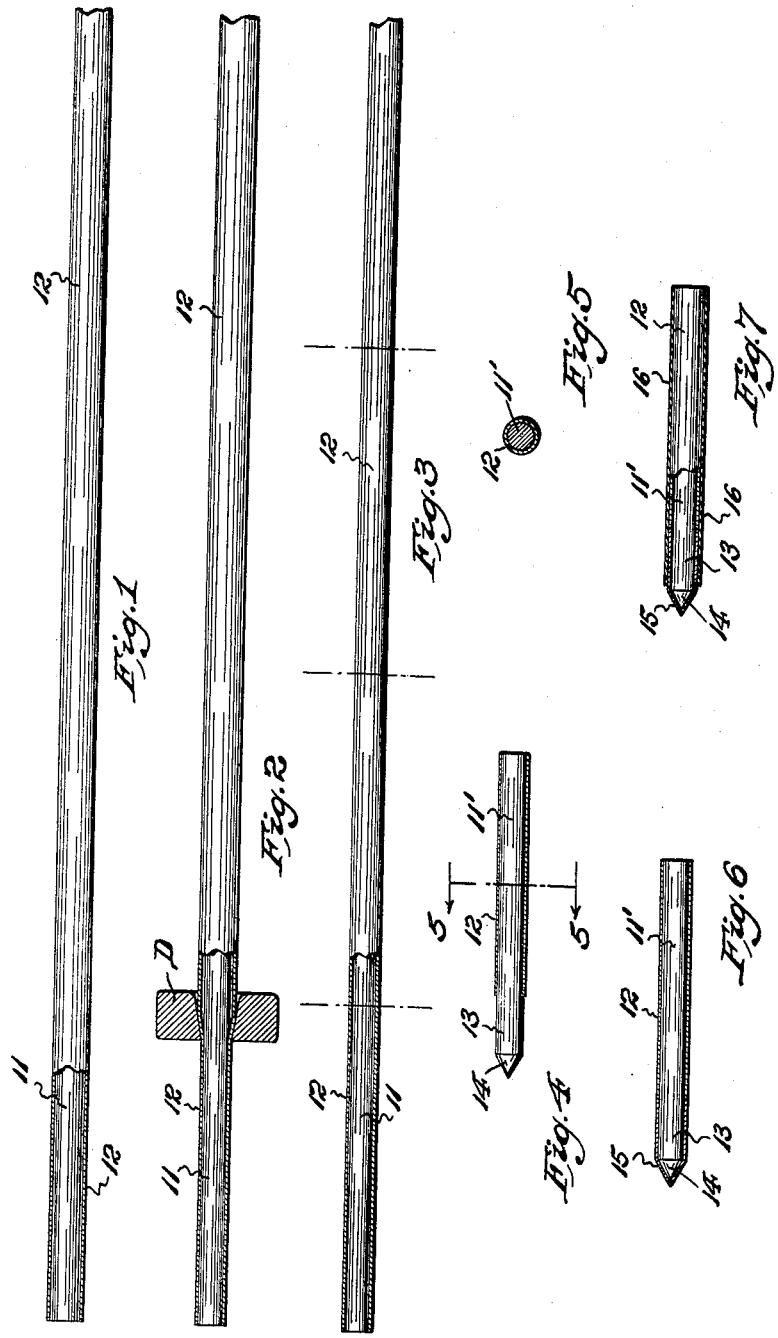

3,109,231
METHOD OF PRODUCING SOLDERING TIPS FOR ELECTRIC SOLDERING IRONS
Richard O. Johnson, Cranford, N.J., assignor to Hexacon Electric Company, Roselle Park, N.J., a firm
Filed June 20, 1960, Ser. No. 37,230
4 Claims. (Cl. 29—411)

This invention relates to an improved method of producing a detachable tip for an electric soldering iron.

It has heretofore been known that the useful life of a copper tip body, or a tip body of some other metal of high heat conductivity, for a soldering iron can be lengthened by coating the same with iron, or with other metal which possesses a harder wearing surface than that of the copper or other body metal. Such iron coating has usually been applied to the tip body by an electroplating process.

It has been proposed to apply a sleeve of stainless steel or other metal harder than iron, over the inner end portion or section of a copper or like tip body which is to be detachably inserted into the tip receiving opening of the heating element of an electric soldering iron, whereby to better protect such portion or section of the tip from oxidation than would an iron coating, and thus substantially eliminate risk of formation of scale by oxidation, and therefore reducing likelihood of the tip being adhered to the heating element in resistance to removal and replacement thereof relative to the electric soldering iron served thereby.

In carrying out such proposed application of a stainless steel sleeve or the like to a copper or like tip body, it has been proposed that the inner end portion or section of the tip body be machined off to reduce its diameter by an amount sufficient to accommodate the thickness of the sleeve, so that, when the latter was telescoped over such reduced portion or section of the tip body, the tip would be of uniform diameter throughout its length. In order to retain the thus applied sleeve against displacement from the tip body, some form of mechanical fastening or coupling is required, such as indentations punched inwardly from the sleeve wall, and adopted to imbed themselves in the relatively soft metal of the tip body. Such fastening or coupling means tends to deform the tip, i.e. tends to throw the same out of round, thus increasing likelihood of the tip sticking or binding in the opening of the heating element of an electric soldering iron to which it is applied, and making it difficult to remove the tip for replacement.

Under the heretofore proposed practice above referred to, not only does the resultant tip structure possess inherent disadvantages, but is costly to produce. It is costly to machine or turn down the copper or like tip body for reception of the stainless steel sleeve, and the longer such turned down portion or section the more costly. By reason of this, the machined or turned down portion or section is kept to a minimum length, so that the sleeve covers only so much of the tip body length as is required to be entered into the heating element of an electric soldering iron to which the tip is to be applied. Due to this, a relatviely long exposed outer end portion or section of the tip body is left which must be iron plated, thus increasing the cost of the plating operation, since more current and more plating material must be used. Furthermore, since there is left a seam at the point where the outer end of the sleeve meets the shoulder of the turned down portion or section of the tip body, and by reason of the fact that the tip body is already weakened by its reduced diameter at this point, a weak spot is created so that risk of breakage at this point is involved. This is especially true with respect to tips of the smaller diameters. Another disadvantage is the fact that, since the sleeve fits somewhat loosely over the tip body, an intermediate air space is left which not only itself decreases thermal conductivity of the tip, but also permits oxygen to enter this space with resultant likelihood of scale formation which will further reduce thermal conductivity.

Having the above in view, it is an object of this invention to provide an improved method of producing a tip structure of the stainless steel clad type which avoids the disadvantages of heretofore proposed tips of this class above referred to.

Another object of this invention is to provide a novel low cost method of producing my improved tip, and especially with respect to the step thereof whereby to intimately unite the stainless steel sleeve to the tip body.

The above and other objects will become apparent from a reading of the following description of my invention in connection with the accompanying drawings, in which:

FIGS. 1 to 4 inclusive are side elevational views in part section which respectively illustrate successive steps of the novel method by which the soldering iron tip of my invention is produced; and FIG. 5 is a cross-sectional view, taken on line 5—5 in FIG. 4.

FIG. 6 is a side elevational view in part section of a finished soldering iron tip according to my invention; and FIG. 7 is a similar view of another form of the finished tip.

Like characters of reference are employed in the several views of the drawings to indicate corresponding parts.

By the novel method for producing soldering iron tips, especially for use in electric soldering irons, according to my invention, a copper rod 11, of suitable diameter and undeterminate length, is provided. Over this copper rod 11 is telescoped a corresponding length of stainless steel tubing 12, of an initial internal diameter somewhat larger than the external diameter of the copper rod 11 (see FIG. 1). The wall thickness of the tubing 12 may be from .001 to .040 inch in thickness, according to the desired diametric size of the copper body of the finished tip.

The thus assembled copper rod 11 and stainless steel sleeve 12 is drawn through a suitable die D, thereby drawing down the sleeve 12 to such reduced diameter that the same will be compressed into intimate, tightly hugging, enveloping relation to and about the copper rod 11, with all intervening air space entirely eliminated, and so that an intermetallic sealing bond is formed therebetween (see FIG. 2). The union of the stainless steel and copper rod thus attained strongly binds the same together against relative movement or displacement, and, since no air space exists therebetween, risk of oxidation or scale formation therebetween is prohibited.

The length of copper rod 11 as thus clad in the stainless steel sleeve 12, is now ready to be cut into sections of suitable length substantially corresponding to the lengths of soldering iron tips desired to be produced. This is indicated in FIG. 3, wherein points of divisions are denoted by transverse broken lines. Preferably, the long length of stainless steel clad copper rod is machined, e.g. by an automatic screw machine operation, such as employed to divide a bare copper rod into soldering tip lengths and to shape the operative tip ends of the latter. By such operation, the stainless steel clad copper rod is not only divided into soldering tip bodies 11', but short forward end portions of the stainless steel sleeve is stripped away and removed, thereby exposing a bare copper soldering tip portion 13, ordinarily about one-half inch in length and approximating about one-fifth to one-third of the length of the tip body 11', while also shaping the extremity 14 thereof to provide a working end of pointed or other desired conformation (see FIG. 4). There is no more machining time involved in this operation than required ot machine a bare or unclad copper rod.

My method, as thus far described, eliminates time consuming and costly cutting to length separately the copper tip bodies and stainless steel sleeves, and therefore avoids the costly and time consuming hand operations required to insert individual copper tip bodies into individual sleeves, as well as additional operations required to mechanically affix the applied sleeves to the tip bodies against displacement therefrom. My method also avoids necessity for machining or turning down rear end portions of the copper tip bodies over which the sleeves are to be fitted, so that the finished soldering tip will possess a uniform diameter from end to end.

The soldering tip portion 13 having been formed, the same is next electroplated with a coating of iron 15 (see FIG. 6), thus obtaining a finished soldering iron tip. Since, under my method, the soldering tip portion 13 is relatively short, as compared with the total length of the soldering iron tip, it will be obvious that necessity of costly and critcial iron plating of a long length of tip portion, which under the heretofore practice above referred to, was of a length of about two inches, or approximately substantially one-half of the length of the tip, is avoided, so that the cost of the iron plating operation under my method is substantially reduced.

By reason of the fact that the copper tip body 11' of my invention is not required to be reduced in diameter for the reception of a stainless steel sleeve, there is no weak point intermediate its ends, which involves risk of breakage. Furthermore, by reason of the fact that, under my invention, the stainless steel sleeve is so tightly bound and united to the copper tip body, the tip cannot become out of round, with involved risk of sticking or binding in the tip receiving opening of the heating element of an electric soldering iron to which it is applied in use, in resistance to detachment and replacement.

In some cases, it is desirable to electroplate the entire tip, with the exception of the working end 14 of the tip portion 13, with a plated coating 16 of a metal which resists wetting by solder or tin, such e.g. as chrome (see FIG. 7). Such chrome or like plating not only increases the tip life, but, since solder does not readily adhere to it, also prevents the solder from undesirable creeping up the tip exterior into the heating element opening of the iron in which the tip is entered, while also decreasing the possibility of solder dropping onto the work being operated upon.

In the above description of my invention, copper is stated to be the material of the core rod 11, but not by way of limitation, and consequently the word "copper," in the specification and claims is intended to be construed to include any other suitable metal of high heat conductivity. Similarly, the designation "stainless steel," as the material of the core enveloping sleeve 12, is intended to be construed to include other suitable metals more resistant to oxidation than iron.

In the above description of my invention, iron plating is stated to be the protective coating used, but not by way of limitation, and consequently the words "iron plating" are intended to be construed to include any other suitable coating which is more resistant to wear than the copper tip it is imposed upon.

Having now described my invention, I claim:

1. A method for producing stainless steel clad soldering iron tips comprising loosely telescoping over a copper rod of considerable length a stainless steel tubing of corresponding length, then compressing the tubing into intimate, tightly hugging enveloping relation to and about the copper rod without intervening air space and so as to be immovably bound thereto by an intermetallic sealing bond, then dividing the thus clad rod into soldering tip lengths including stripping away from each such length a relatively short end section of the tubing to provide a projecting bare copper soldering tip portion having a suitably shaped free working end, and then iron plating said bare tip portion.

2. A method for producing stainless steel clad soldering iron tips according to claim 1, including the further step of plating the tip with an external coating of a metal resistant to wetting by solder to envelope the length of the tip with the exception of the working end of its soldering tip portion.

3. A method for producing stainless steel clad soldering iron tips comprising loosely telescoping over a copper rod of considerable length a stainless steel tubing of corresponding length, then drawing the assembled tubing and rod through a die operative to compress the tubing into intimate, tightly hugging enveloping relation to and about the copper rod without intervening air space and so as to be immovably bound thereto by an intermetallic sealing bond, then dividing the thus clad rod into soldering tip lengths including stripping away from each such length a relatively short end section of the tubing to provide a projecting bare copper soldering tip portion having a suitably shaped free working end, and then iron plating said bare tip portion.

4. A method for producing stainless steel clad soldering iron tips according to claim 3, including the further step of plating the tip with an external coating of a metal resistant to wetting by solder to envelope the length of the tip with the exception of the working end of its soldering tip portion.

References Cited in the file of this patent

UNITED STATES PATENTS

| | | |
|---|---|---|
| 187,175 | Rice | Feb. 6, 1877 |
| 438,072 | Everson | Oct. 7, 1890 |
| 550,705 | Williams | Dec. 3, 1895 |
| 1,227,346 | Trood et al. | May 22, 1917 |
| 2,001,848 | Nyquist | May 21, 1935 |
| 2,140,910 | Hensel et al. | Dec. 20, 1938 |
| 2,346,462 | Southwell et al. | Apr. 11, 1944 |
| 2,558,093 | Kinney | June 26, 1951 |
| 2,679,223 | Franklin | May 25, 1954 |